Sept. 5, 1933.     J. B. STRAUSS     1,925,415
COOLING SYSTEM FOR MOVING VEHICLES
Filed June 3, 1929
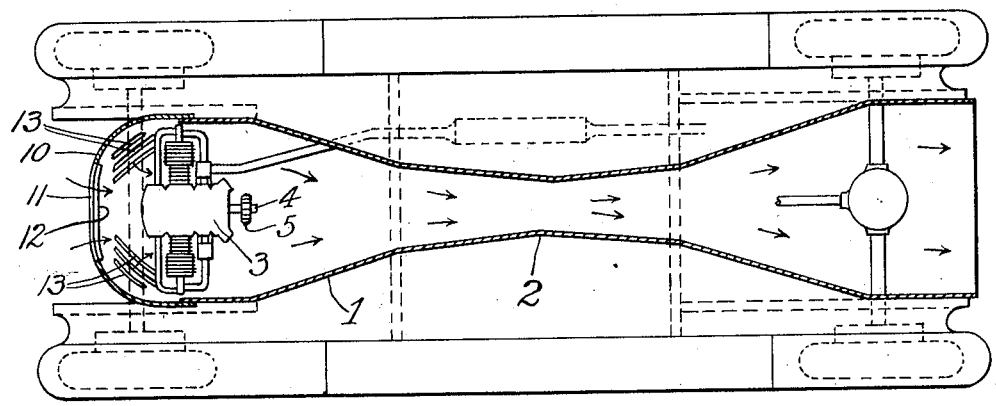
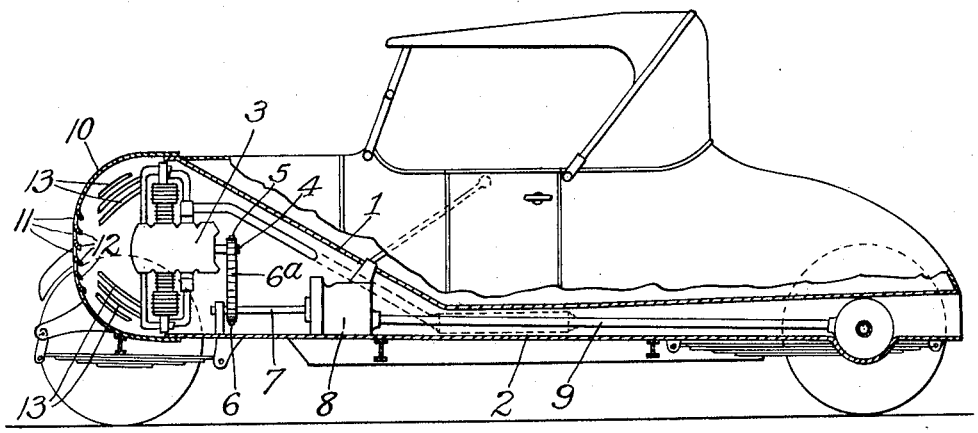
Inventor
Joseph B. Strauss
by Parker & Carter
Attorneys.

Patented Sept. 5, 1933

1,925,415

UNITED STATES PATENT OFFICE 1,925,415

COOLING SYSTEM FOR MOVING VEHICLES

Joseph B. Strauss, Chicago, Ill.

Application June 3, 1929. Serial No. 367,979

8 Claims. (Cl. 123—171)

This invention relates to a cooling system for moving vehicles and has for its object to provide a new and improved system of this description.

The invention is adapted to be used in connection with any moving vehicle such as flying machines, automobiles or the like.

The invention has as a further object to provide means whereby a current of air is directed on and past the engine when the vehicle is in motion.

The invention has as a further object to provide a draft tube with the engine in the front end thereof and a cowling connected with the front end of said draft tube.

The invention has further objects which are more particularly pointed out in the accompanying description.

Referring now to the drawing, Fig. 1 is a side view with parts broken away showing the invention as applied to one form of moving vehicle and with the draft tube and cowling in section.

Fig. 2 is a plan view of the device shown in Fig. 1 with the top removed and the draft tube and cowling shown in section.

Like numerals refer to like parts throughout the several figures.

Referring now to the drawing, I have shown a construction wherein there is a draft tube 1 which is open at the front and the rear, the tube preferably being contracted at some point 2 between the front and rear ends. An engine 3 preferably of the internal combustion type is located in the front end of the draft tube. This engine is cooled by any suitable mechanism and is connected with the driving shaft of the vehicle. As herein shown the engine shaft 4 is provided with the gear 5 which is connected by a belt or chain 6a with a wheel 6 on the shaft 7 and the shaft 7 is connected by the speed changing gear shift mechanism 8 with the driving shaft 9 which is connected with the propelling mechanism of the vehicle such as the propeller or the rear wheels or the like.

The open end of the draft tube 1 is provided with a cowling 10 which preferably partially surrounds the engine and which is provided with a series of air admission openings 11 through which air passes when the vehicle is in motion, the current of air being directed on and past the engine so as to cool the cylinders thereof. The cowling may have associated with said openings the air directing elements 12 and these may be formed so as to direct the air most effectively to secure the maximum cooling effect of the cylinders. There may also be openings or vents in the sides of the tube or cowling near the front end so that the volume of air directed on and past the engine is increased and the air stream directed toward the hottest cylinders of the engine. These side vents are shown at 13. It will be seen that by means of this construction the engine whether it be an airplane or an automobile or the like has directed upon its cylinders a current of cool air and this is done by the moving of the vehicle itself and it will further be seen that the cowling protects the engine and at the same time permits the proper current of air to be directed thereon.

It will be noted that the axis of the motor is central with relation to the axis of the cowling. It will further be noted that the motor is of the radial type and that it is mounted in the mouth of the tube and outside of the body of the car, the engine being located in front of or outside of the conventional hood ordinarily used.

I claim:

1. A cooling system for motor cars comprising a central draft tube extending from the front to the rear of the car, a radial type engine mounted in the mouth of said tube and in front of it, having all of its cylinders in a plane crosswise of the tube, a cowling enclosing said engine and vents in said cowling in front of said engine, whereby air is directed past the engine to cool it when the car is in motion.

2. A cooling system for motor cars comprising a central draft tube extending from the front to the rear of the car, a radial type engine mounted in the mouth of said tube and outside of the body of the car said engine having all of its cylinders in a plane crosswise of the tube, a cowling enclosing said engine and vents in said cowling, whereby air is directed past the engine to cool it when the car is in motion.

3. A motor car comprising a body, a radial type engine, said engine located outside the body and in front of same and having all of its cylinders in a plane crosswise of said body, a conical housing enclosing said engine and projecting in front of it, vents in said housing and a draft tube extending from the rear of said housing to the rear of the car.

4. A motor car comprising a body, a radial type engine, said engine located outside the conventional hood and in front of same, the space now occupied by the conventional hood thus being released for other purposes, a conical housing enclosing said engine and projecting in front of it, vents in said housing and a draft tube extending from the rear of said housing to the rear of the car, all of the cylinders of said engine being in a plane crosswise of said tube.

5. A motor car comprising a chassis, a body, an engine mounted on the chassis at right angles to it, so as to leave the chassis free, a housing in front of said engine to enclose it, vents in said housing, a draft tube at the rear of said engine and extending to the rear of the car, all of the cylinders of said engine being in a plane crosswise of said tube.

6. A motor car comprising an engine in a vertical plane at the front end of the chassis and clear of it, a conical housing in front of said engine and enclosing it, vents in said housing, a draft tube at the rear of said engine and extending to the rear of the chassis, said cowling and draft tube connected, a driving shaft associated with said engine and mechanism associated with said driving shaft to move the car, whereby the engine is automatically cooled by the passage of air through the cowling and draft tube as the car moves, all of the cylinders of said engine being in a plane crosswise of said tube.

7. A cooling system for vehicles comprising an engine, a cowling in front of said engine, a tube at the rear of said cowling and extending toward the rear of said engine, the axis of said engine central with the axis of the cowling and tube, vents in said cowling and an opening in the rear of said tube, whereby the engine is automatically cooled by the passage of the air through the cowling and the tube when the vehicle is moved, all of the cylinders of said engine being in a plane crosswise of said tube.

8. A cooling system for vehicles comprising an engine, a cowling in front of said engine, a tube connected with said cowling and extending rearwardly therefrom, an engine mounted within the area covered by said cowling and tube, the top of the tube being bent downwardly and rearwardly until it comes in proximity to the bottom of said tube, and vents in said cowling at the front thereof and on the sides thereof near the top and near the bottom, all of the cylinders of said engine being in a plane crosswise of said tube.

JOSEPH B. STRAUSS.